(12) United States Patent
Barrett (10) Patent No.: US 8,584,580 B2
(45) Date of Patent: Nov. 19, 2013

(54) SYSTEM AND DEVICE FOR GRILLING FOODS

(76) Inventor: Brad Barrett, Cartersville, GA (US)

( * ) Notice: Subject to any disclaimer, the term of this patent is extended or adjusted under 35 U.S.C. 154(b) by 790 days.

(21) Appl. No.: 12/357,442

(22) Filed: Jan. 22, 2009

(65) Prior Publication Data

US 2009/0196970 A1    Aug. 6, 2009

Related U.S. Application Data

(60) Provisional application No. 61/062,014, filed on Jan. 22, 2008.

(51) Int. Cl.
| | |
|---|---|
| *A23L 1/01* | (2006.01) |
| *F23H 13/00* | (2006.01) |
| *F23H 17/12* | (2006.01) |
| *A47J 37/06* | (2006.01) |

(52) U.S. Cl.
USPC ....... 99/422; 426/523; 126/152 R; 126/163 R (58) Field of Classification Search
USPC ........... 99/444–446, 449, 450, 375, 400, 425, 99/388, 430; 126/25 R, 41 R, 214 C
See application file for complete search history.

(56) References Cited

U.S. PATENT DOCUMENTS

| | | | |
|---|---|---|---|
| 1,090,924 A | 3/1914 | Lawrence | |
| 1,650,634 A | 11/1927 | Ltjtzler | |
| 1,732,910 A | 10/1929 | Possons | |
| 1,869,899 A | 8/1932 | Kuckel | |
| 2,006,385 A | 7/1935 | Dikeman | |
| D109,133 S | * 4/1938 | Galleazzi | ....................... D7/664 |
| 2,411,993 A | 12/1946 | Hobson | |
| 2,682,263 A | 6/1954 | Brodbeck | |
| 2,985,097 A | 5/1961 | Nevin et al. | |
| 3,292,528 A | 12/1966 | Myler | |
| 3,404,673 A | 10/1968 | Tappan et al. | |
| 4,121,510 A | 10/1978 | Frederick | |
| D255,413 S | 6/1980 | Alexander | |
| D260,221 S | 8/1981 | Lee et al. | |
| 4,316,627 A | * 2/1982 | Solypa | .......................... 294/1.4 |
| 4,384,513 A | 5/1983 | Pierick | |
| D282,139 S | 1/1986 | Radford | |

(Continued)

FOREIGN PATENT DOCUMENTS

EP    1347070 B1    2/2007

OTHER PUBLICATIONS

Ferro. Ferro Evolution™ Coatings Provide Metallic Looks That Last [online] [retrieved on Nov. 6, 2007]. Retrieved from the Internet: <URL: http://www.ferro.com./spotlight/Ferro+Evolution™+Coatings+Provide+Metallic+Looks+That+Last.htm>.

(Continued)

*Primary Examiner* — Jianying Atkisson (57) ABSTRACT

A system of modular, interlocking, raised-rail grate panels and a complementarily-shaped basin for supporting and peripherally-containing the base of the grate panels while continuing to allow the passage of gasses lengthwise between the raised rails and the passage of gases and liquids through the base of the grate panels, such that delivery of searing and reflective heat to a cooking food is facilitated, wherein the grate panels and basin are coated with an abrasion-resistant, high-temperature, easy-to-clean, non-stick coating for ease of use, and wherein accessory features such as integrated, stylized food branding irons and raised-rail adaptive cooking tools are optionally provided.

11 Claims, 7 Drawing Sheets

(56) References Cited

U.S. PATENT DOCUMENTS

| | | | |
|---|---|---|---|
| 4,885,989 A | 12/1989 | Korpan | |
| 5,057,331 A | 10/1991 | Levinson | |
| 5,105,725 A * | 4/1992 | Haglund | 99/446 |
| 5,131,320 A * | 7/1992 | Jensen et al. | 99/422 |
| 5,185,172 A | 2/1993 | Barkhau et al. | |
| 5,220,140 A * | 6/1993 | Ball et al. | 219/759 |
| 5,400,703 A | 3/1995 | Ashcom et al. | |
| D363,410 S | 10/1995 | Hazen | |
| 5,467,691 A | 11/1995 | Koziol | |
| 5,488,897 A * | 2/1996 | Snyder | 99/445 |
| D383,355 S | 9/1997 | Uter | |
| 5,800,853 A | 9/1998 | Wang | |
| 6,102,028 A | 8/2000 | Schlosser et al. | |
| 6,362,458 B1 | 3/2002 | Sargunam et al. | |
| D463,202 S | 9/2002 | Smith | |
| 6,831,027 B2 | 12/2004 | Gazo | |
| 6,872,441 B2 | 3/2005 | Baumann et al. | |
| 6,896,934 B2 * | 5/2005 | Aronica et al. | 427/475 |
| 7,005,396 B2 | 2/2006 | Espargilliere et al. | |
| 7,152,525 B2 | 12/2006 | Armstrong | |
| 7,244,502 B2 | 7/2007 | Aronica et al. | |
| 2005/0115840 A1 * | 6/2005 | Dolan | 205/324 |
| 2006/0054034 A1 * | 3/2006 | Armstrong | 101/21 |
| 2006/0144248 A1 | 7/2006 | Backus et al. | |
| 2009/0044795 A1 * | 2/2009 | Shaffer et al. | 126/215 |

OTHER PUBLICATIONS

Ferro. RealEase™ Provides Tougher Nonstick Coatings for Cookware, Bakeware and Appliances [online] [retrieved on Nov. 6, 2007]. Retrieved from the Internet: <URL: http://www.ferro.com/spotlight/RealEase.htm>.

* cited by examiner

SYSTEM AND DEVICE FOR GRILLING FOODS

CROSS-REFERENCE AND PRIORITY CLAIM TO RELATED APPLICATION

To the fullest extent permitted by law, the present U.S. Non-Provisional patent application claims priority to and the benefit of United States Provisional patent application entitled "System and Device for Grilling Foods," filed on Jan. 22, 2008, on behalf of inventor Brad Barrett, and having assigned Ser. No. 61/062,014.

FIELD OF THE INVENTION

The present invention relates generally to cooking devices, and more particularly, to a system and device for grilling foods, wherein a distinctively shaped, specially coated grilling grate withstands continuous heat at 600° F. and spikes there beyond, thereby enabling non-stick outdoor grilling, wherein the distinctive grate configuration coupled with a uniquely specialized nesting pan facilitates unparalleled indoor, in-oven grilling, and wherein a branding iron component facilitates selective creation of stylized grill markings during both indoor and outdoor food grilling.

BACKGROUND OF THE INVENTION

Fresh, healthy foods prepared on a grill are both flavorful and nourishing. As a result, the popularity of grilled foods continues to increase. Restaurants offer a variety of grilled selections. Cookbooks abound with grilling recipes. However, properly preparing foods on traditional grills can be difficult.

For example, charcoal grills typically require a waiting period following ignition of the charcoal in order to allow for a proper cooking temperature to be achieved. And, even then, the temperature is far from precise and consistent. Additionally, although many charcoal grills are portable, some are permanently installed, such as in parks and multi-family residences. At least with respect to such permanently installed grills, direct food contact with the permanent grill surface is not necessarily desirable. For example, such a grill surface may not be clean. And, with respect to essentially all grills, frequently, either from repeated use, improper cleaning, utensil damage, or the like, foods may unfortunately adhere thereto.

Personal gas grills overcome many of these disadvantages, wherein warm up and temperature accuracy and precision are improved. However, presently available grill grates continue to offer disadvantages in view of the present invention. In addition to foods adhering to the surface thereof, known grill grates allow for flame ups, quickly burning foods and food surfaces, and known grill grates generally do not allow for effective grilling of a wide variety of foods. Non-stick surfaces such as TEFLON cannot be utilized on grates exposed to high temperature grilling environments because of off-gassing and decomposition. Porcelain, an alternative grate surface coating, can withstand high temperatures; however, porcelain is frequently subject to easy abrasion and chipping. Cleaning is difficult, at best. Even in the absence of food-sticking issues, many foods unfortunately fall through the rungs or grates of known grills. Baskets and foils have been suggested as a means of containing smaller, at-risk foods for grilling; however, such devices either generally do not allow for the full realization of the true "grilling" flavor because of a lack of surface contact, or searing, or because of too much surface contact, resulting in a pan-seared finish rather than a grilled finish.

Indoor devices have been offered with a variety of cook surfaces in an effort to avoid some of the deficiencies of outdoor grilling surfaces and also in an effort to eliminate the need to venture out-of-doors into the elements in order to grill. Each is disadvantageous in view of the present invention. For example, self-contained electric grilling units for indoor use provide a means of grilling meats or the like, but are generally unable to accommodate a wide variety of foods. Further, cleaning is frequently a difficult chore. Similarly, stove top grill components also provide a means of grilling some foods; however, such components are typically cumbersome, messy to use, and also difficult to clean.

Devices intended for oven-based simulation of grilled foods have been described, but these, too, are disadvantageous in view of the present invention. Components exist for direct use on an existing oven rack, or as replacements for oven racks; however, these known devices do not alleviate the limitations with respect to the effective grilling of a variety of foods. Further, these known devices do not effectively re-create the grilled food flavor and/or appearance, they generally allow for messy dripping and flame-ups, and they continue to be difficult to clean.

Therefore, it is readily apparent that there is a need for a system and device for grilling foods, wherein a non-stick, distinctively-shaped grate is able to withstand high temperature grilling to deliver effective and evenly-grilled flavor to virtually any food, wherein such a grate can be utilized in combination with essentially any outdoor grill, and such a grate can further be utilized in combination with a uniquely specialized nesting pan for unparalleled indoor, in-oven grilling, thereby defining a grilling system with a plurality of applications and avoiding the above-discussed disadvantages.

BRIEF SUMMARY OF THE INVENTION

Briefly described, in a preferred embodiment, the present invention overcomes the above-mentioned disadvantages and meets the recognized need for such a device by providing a system and device for grilling foods, wherein a distinctively shaped, specially coated grilling grate withstands continuous heat at 600° F., and spikes there beyond, thereby enabling non-stick outdoor grilling, wherein the distinctive grate configuration is also coupled with a uniquely specialized nesting pan to facilitate unparalleled indoor, in-oven grilling, wherein a branding iron component facilitates selective creation of stylized grill markings during both indoor and outdoor food grilling, and wherein strategically-shaped accessory tools facilitate non-destructive food handling.

According to its major aspects and broadly stated, in its preferred form, the present invention is a system of modular, interlocking, raised-rail grate panels and a complementarily-shaped basin for supporting and peripherally-containing the base of the grate panels while continuing to allow the passage of gasses lengthwise between the raised rails and the passage of gases and liquids through the base of the grate panels, such that delivery of searing and reflective heat to a cooking food is facilitated, wherein the grate panels and basin are coated with an abrasion-resistant, high-temperature, easy-to-clean, non-stick coating for ease of use, and wherein accessory features such as integrated and/or removable, stylized food branding irons and raised-rail adaptive cooking tools are optionally provided.

More specifically, the device of the present invention in its preferred form is a system for grilling foods comprising a plurality of raised-rail grate panels and a precisely configured mate pan, wherein each panel and pan is coated with an abrasion-resistant, temperature-tolerant coating, preferably REALEASE porcelain enamel hybrid coating, such that a non-stick outer surface is provided to safely and effectively perform in continuous heat of 600° F. and with spikes there beyond, as may be expected during grilling, and with quick and easy cleanup. Anodic coatings may also be utilized, wherein even greater abrasion resistance may be realized.

Each thermally conductive grate panel is distinctly configured with an essentially flat base and inter-rail surfaces to respectively allow for effective collection of heat from the source and reflection of heat, upwardly and between the raised rails, in addition to the direct heat transfer from the base to the top of each rail, in order to form perfect searing marks on cooking foods. Each inter-rail surface of the grate panel is essentially solid, in order to enhance heat transfer, to prevent inadvertent passage of food therethrough, and to allow the "good juices" to flavorfully sizzle just below the cooking food (rather than in the bottom waste collector of the grill); however, each further comprises a strategic plurality of apertures, whereby gases and undesirable fatty liquids may pass, as desired, and as will be discussed further hereinbelow.

The mate pan is ideally configured with a central cavity much like a traditional roasting pan, but also with a supportive peripheral ledge extending about the margin of the mate pan and a retentive peripheral lip extending about the peripheral ledge. In such manner, one or more raised-rail grate panels may be securely housed within the peripheral lip such that inadvertent slidable motion is inhibited and such that base support is provided by the peripheral ledge. This configuration enables the raised rails of the supported grate panels to extend above the sides and lip of the mate pan, whereby although direct contact of the grate panel with the heat source is prevented, a real "grilled" cooking effect is achieved due to the flow of heated air and gasses between the raised rails. This flow may be achieved with the grate panels on essentially any grill, even in the absence of the mate pan, but is uniquely maintained to facilitate indoor, in-oven grilling with the mate pan positioned above the heat source.

Because gases and liquids can pass through the apertures in the inter-rail surfaces of the grate panels, healthier grilled foods may be created by evacuating fatty juices therethrough, either directly into a grill, as desirable, or into the mate pan central cavity, thereby preventing oven or grill mess. Conversely, presentation of flavored liquids for steaming, or wetted wood chips for "smoking," or the like can be accomplished via the mate pan central cavity.

The present system for grilling foods also provides for selective modular raised-rail grate panels with integrated and/or removable, stylized branding irons, such that incorporation of such a grate panel onto a grilling surface enables creation of a stylized grill mark or brand on a cooked food. The brands are preferably integrally formed coincident with the raised cook surface of the grate panel rails, without the necessity of specialized heat conductors, wherein licensed marks, such as collegiate logos, could be effectively seared, or branded, onto foods, such as at an outdoor tailgate event with cooking on a charcoal, electric or gas grill, or at a home-based bowl game party with grilling in a conventional oven. In an alternate embodiment, the brands may be removably engaged with one or more rails of the grate panel, such as, for example, by springed engagement, friction fit, threaded engagement or the like.

In order to facilitate non-destructive food-handling coincident with the use of the raised-rail grate panels, either with or without the mate or basin pan, and either on a outdoor grill or in an indoor oven, a multi-fingered spatula is preferably provided. The multi-finger shape allows for easy access between the raised rails of the grate panels for lifting of food, rather than scraping along the upper surface of by a traditional spatula, and for effective scooping of vegetables, bacon, or the like. A further adapted multi-finger spatula is also provided for specialized use with the branding iron grate panels, wherein the outer fingers of the spatula have a greater length than the inner fingers in order to facilitate lifting access between the raised rails on either side of the branding iron by the outer fingers, yet to avoid impedance in lifting of the inner fingers via contact with the branding iron.

Thus, a feature and advantage of the present invention is its ability to be utilized in either an outdoor or indoor setting, on essentially any grill, as well as in a conventional oven.

Another feature and advantage of the present invention is its ability to offer a new manner for an enthusiast to exhibit an allegiance or other desirable message via food branding on essentially any grill or in essentially any oven.

Still another feature and advantage of the present invention is its ability to eliminate and replace the conventional broiler pan.

Yet another feature and advantage of the present invention is its ability to provide a grill grate with a nonstick coating that does not burn off at temperatures over 500° F.

Still yet another feature and advantage of the present invention is its ability to provide a grill grate with a nonstick coating that will not off-gas at elevated temperatures.

Still yet another feature and advantage of the present invention is its ability to facilitate essentially identical grilled cooking results in an indoor oven of essentially any food that can be cooked on an outdoor grill.

Yet still another feature and advantage of the present invention is its ability to provide a new cooking system for ovens.

Yet another feature and advantage of the present invention is its ability to provide for safe use via prevention of inadvertent slidable motion of the grate panels when nested in the mate pan.

Still another feature and advantage of the present invention is its ability to deliver perfect searing marks and moist tender cooked food irrespective of whether grilling takes place on a grill or in an oven.

Yet another feature and advantage of the present invention is its ability to provide a non-stick grill grate with three times the scratch resistance of conventional non-stick coatings.

Still yet another feature and advantage of the present invention is its ability to facilitate lifting of delicate foods via adapted accessory tools.

Yet still another feature and advantage of the present invention is its modular ability to adapt to a plurality of grill surface dimensions.

Still another feature and advantage of the present invention is its ability to lay on top of any existing grill, thereby protecting the surface thereof and preventing flame-ups, wherein the warm cooking surface may be quickly and easily wiped clean.

Yet another feature and advantage of the present invention is its ability to facilitate oven or grill-top grilling of essentially any food, such as, meats, fish, vegetables, pasta, fruit, pizza, or the like.

Still another feature and advantage of the present invention is its ability to facilitate an expanded range of grillable food, without also incorporating the use of foils or further accessory receptacles.

These and other objects, features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 2 is an overhead, partial perspective view of a grill grate, according to the preferred embodiment of the present invention;

DETAILED DESCRIPTION OF THE PREFERRED AND ALTERNATE EMBODIMENTS

In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

Figure 3:
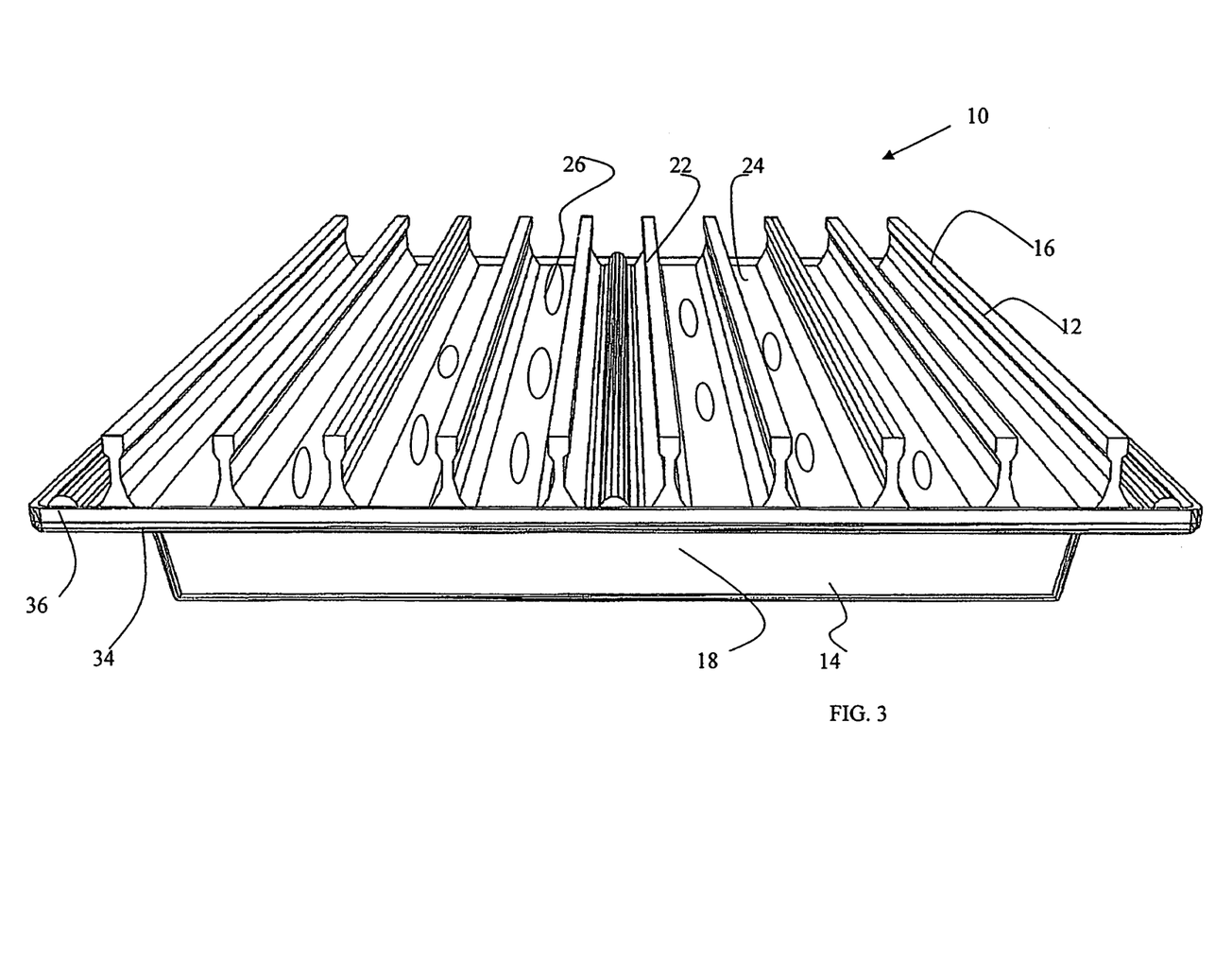
FIG. 3 is a front perspective view of the preferred embodiment of the present invention, showing a pair of grill grates installed on a mate pan.
Figure 4:
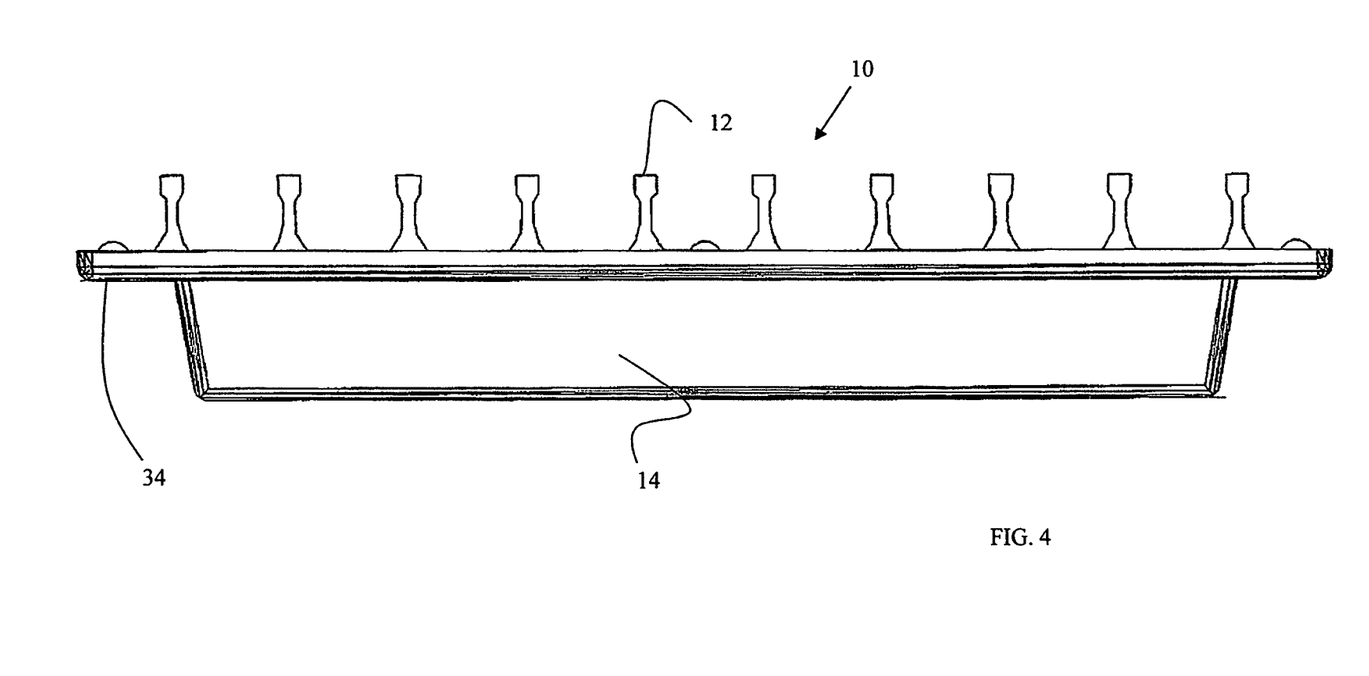
FIG. 4 is a side view of the embodiment of FIG. 3, showing the preferred proportional extension of the raised rails above the upper edge of the mate pan.

Referring now to FIGS. 3 and 4, the present invention in the preferred embodiment is a system and device for grilling foods 10, comprising raised-rail grate panel 12 and mate pan 14. Preferably, each panel 12 and mate pan 14 is coated with an abrasion-resistant, temperature-tolerant coating, preferably REALEASE porcelain enamel hybrid coating, such that non-stick outer surface 16 and 18, respectively, is provided to enable safe and effective sustained use at 600° F. and tolerance during brief periods at temperatures even thereabove. Further, each coated panel 12 and mate pan 14 may simply be wiped clean with a cloth when warm, and is also dishwasher safe. The application of the preferred porcelain enamel hybrid coating, traditionally utilized on ceramic cookware and bakeware, to raised-rail grate panel 12 facilitates the realization of true non-stick performance for outdoor grilling, with quick and easy clean-up. However, during product development and testing experimentation, the preferred porcelain enamel hybrid coating was discovered to also facilitate in-oven grilling, with performance and results truly comparable to outdoor grilling; hence, the conception of system and device for grilling foods 10.

Each raised-rail grate panel 12 is thermally conductive, and is manufactured from appropriate materials, such as, for exemplary purposes only, aluminum. The preferred shape is distinctive, wherein essentially flat base 20 receives, collects, and transfers heat directly from the source during use on an outdoor grill, and via barrier mate pan 14 during use in an oven. Plurality of raised rails 22 alternate with plurality of inter-rail surfaces 24 to define each panel 12 in such a manner that when coated with REALEASE, heat is efficiently reflected upwardly from plurality of inter-rail surfaces 24, between plurality of raised rails 22. The coupling of this reflected heat on the surface of each raised rail 22 with the heat conducted upwardly within each raised rail 22 imparts a searing characteristic heretofore unrealized.

Each inter-rail surface 24 of grate panel 12 is essentially solid, in order to enhance heat transfer, to prevent inadvertent passage of food therethrough, and to allow for the flavorful heating of food juices below and proximate the cooking food. Additionally, the essentially solid nature of each inter-rail surface 24 prevents flame-ups that can disadvantageously burn foods cooking on traditional grates. Preferably, plurality of apertures 26 is defined in each inter-rail surface 24, whereby the dimension, placement and number of such apertures 26 is defined to allow the passage of gases and undesirable fatty liquids therethrough without compromising the benefits of the essentially solid nature of each inter-rail surface 24, as discussed above.

Figure 1:
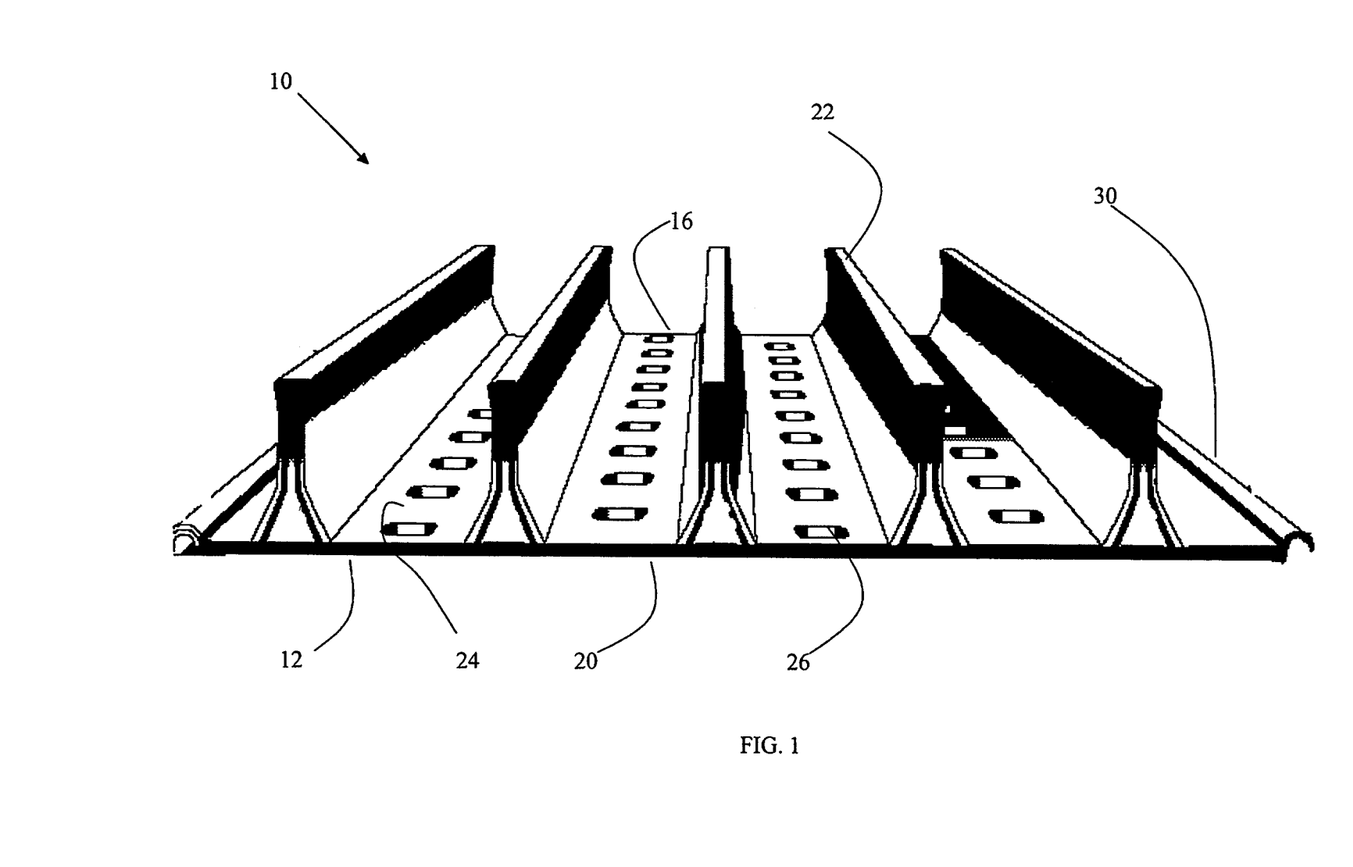
FIG. 1 is perspective, end view of a grill grate, according to the preferred embodiment of the present invention.
Figure 2:
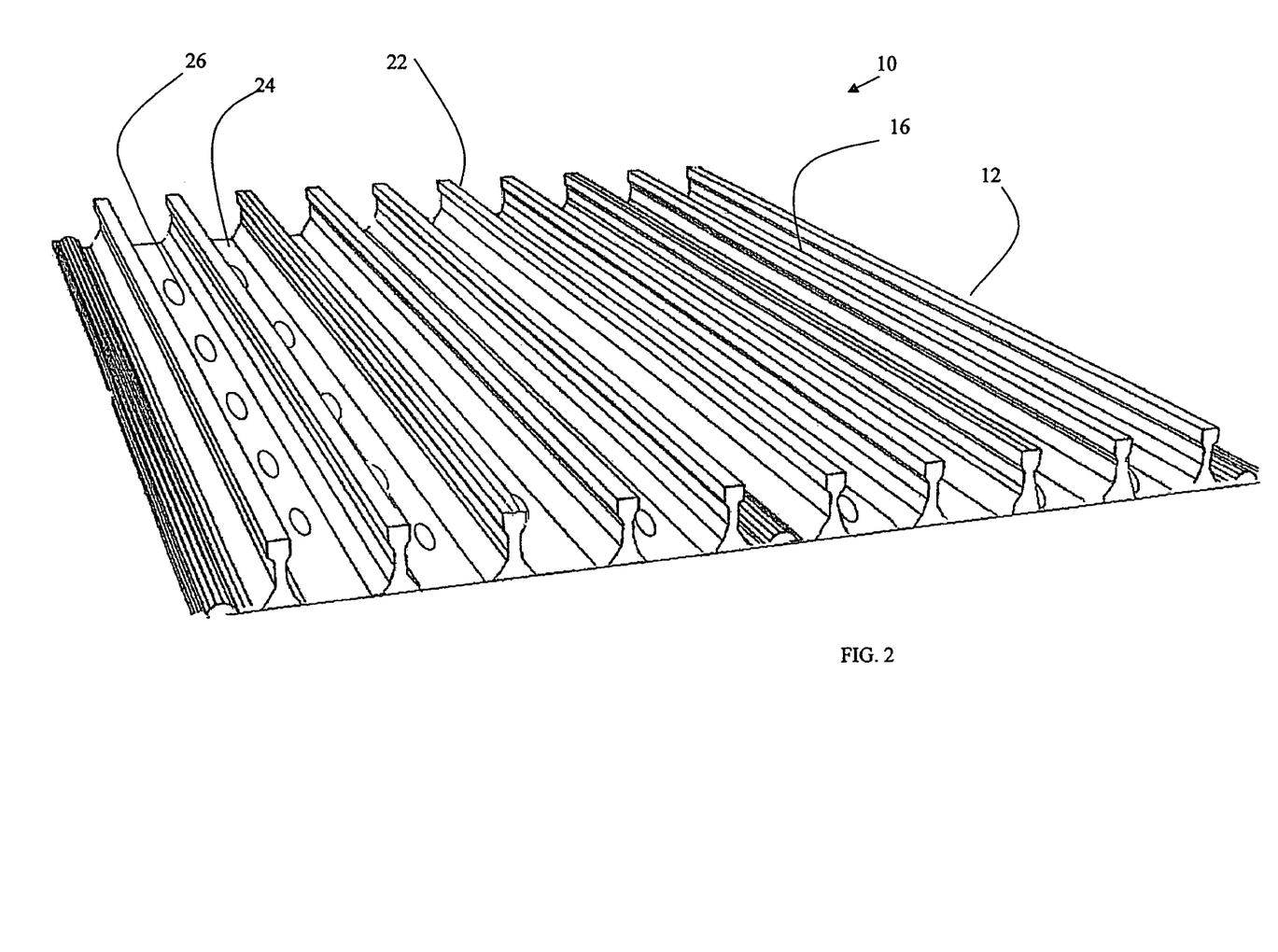
FIG. 2 is an overhead, perspective view of a plurality of grill grates, according to the preferred embodiment of the present invention, showing two grill grates interlocked to define a select grilling surface dimension.

Preferably, each raised-rail grate panel 12 is a modular component of system and device for grilling food 10, wherein multiples panels 12 may be selectively interlocked together to create a grilling surface or desired surface area, as seen in FIG. 2. The elongate slide interlock 30 is preferably configured as shown in FIG. 1, and as is known in the art for joining planar components; however, other means of association could alternately be utilized, as appropriate. Referring now to FIG. 3, it is preferred that two raised-rail grate panels 12 slidably interlock to seat within mate pan 14.

Figure 5:
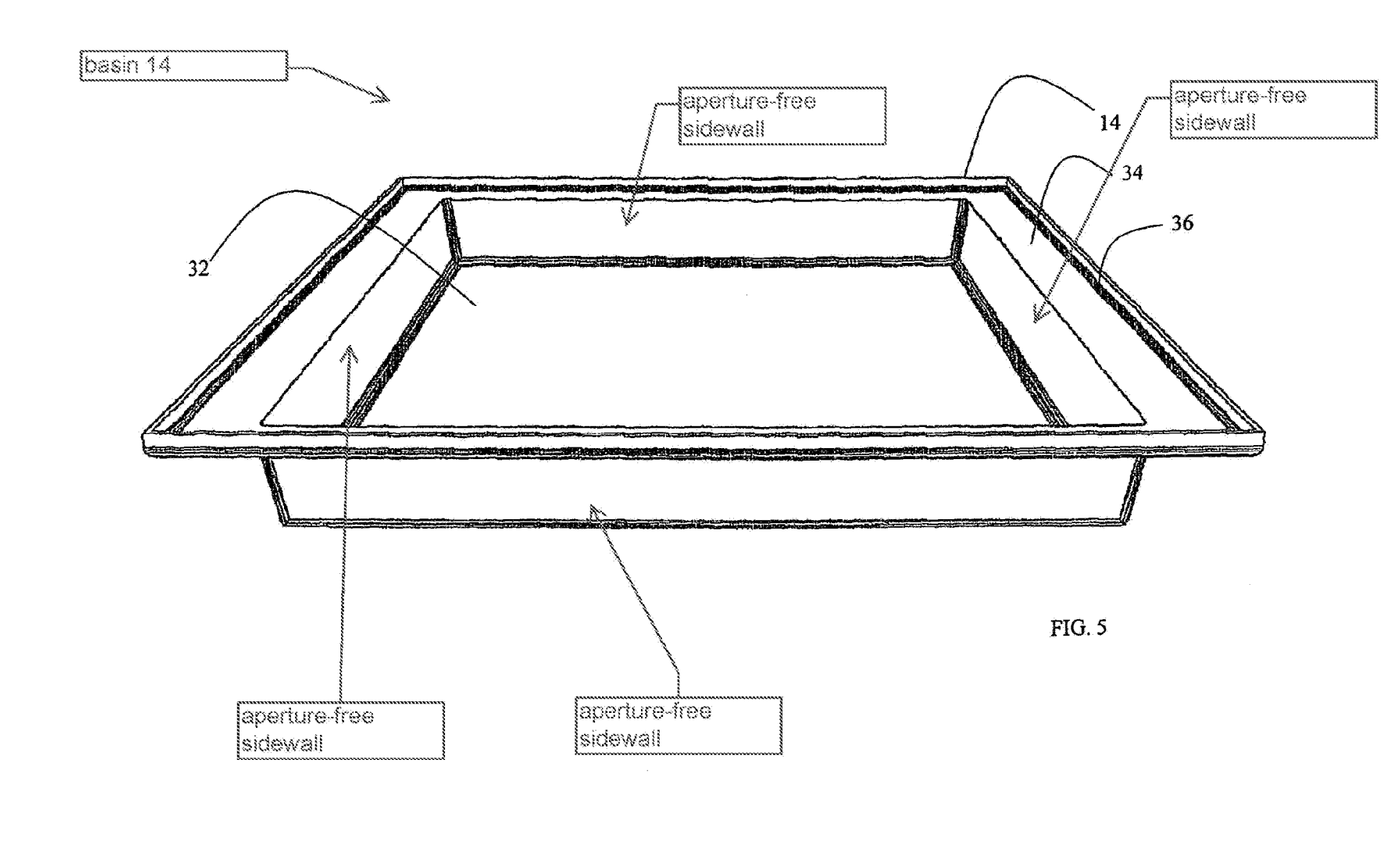
FIG. 5 is a front perspective view of the mate pan of FIG. 4.

Mate pan 14 is preferably configured with central cavity 32 therein, much like a traditional roasting pan, but also with peripheral ledge 34 extending about the margin of mate pan 14 and peripheral lip 36 extending about and bordering peripheral ledge 34, as best seen in FIGS. 4-5. In such manner, grate panels 12 may be seated within the boundary of peripheral lip 36, as seen in FIGS. 3 and 4, such that inadvertent slidable motion is inhibited. Seated grate panels 12 are supported by peripheral ledge 34, wherein open space is largely provided under each grate panel 12 and above central cavity 32. This preferred configuration for mate pan 14 prevents direct contact of grate panel 12 with the heat source, but nonetheless delivers an authentic grill cooking effect due to the flow of heated air and gasses lengthwise between raised rails 22 that is permitted by the preferred extension or raised rails 22 above mate pan 14, as seen is FIG. 4. This gas flow between raised rails 22 is one of the features of system and device for grilling foods 10 that renders indoor, in-oven grilling possible, even with mate pan 14 positioned above the heat source and functioning as a barrier between the heat source and grate panel 12.

Another beneficial feature of system and device for grilling foods 10 is the usefulness of central cavity 32 within mate pan 14. Central cavity 32 is adapted to capture fatty juices that may drip from cooking foods atop raised rails 22, thereby allowing the removal of undesirable fats and the creation of healthier foods, yet without creation of a messy oven interior.

Central cavity 32 may also be utilized for retention of flavored liquids, thereby enabling effective steaming coincident with grilled searing, further sealing in flavors. Further, wood chips and liquids may be placed in central cavity 32 to enable delivery of a smoked flavoring, even during in-oven grilling.

Figure 6:
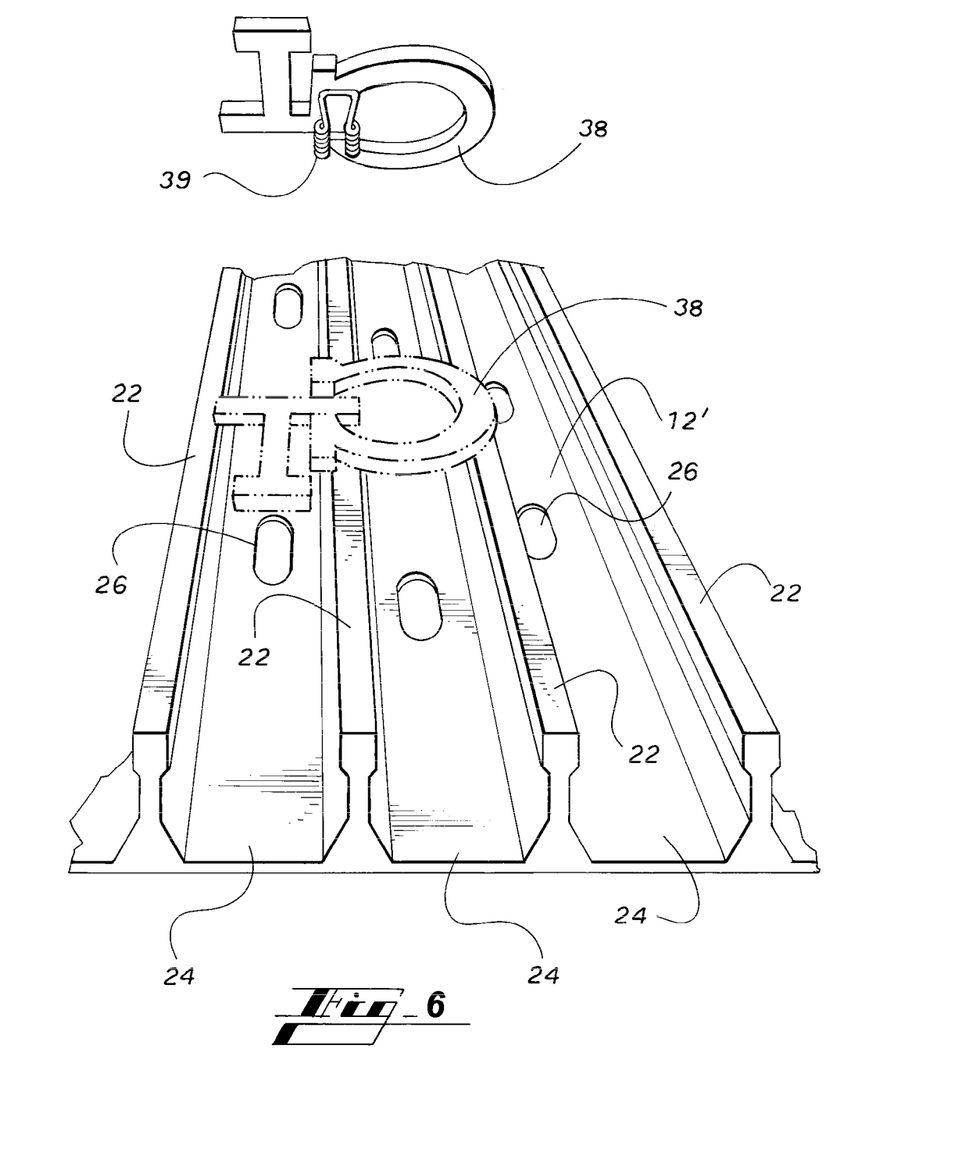
FIG. 6 is a view of a grill grate, according to an alternate embodiment of the present invention, showing an on-board branding iron and a removable branding iron.

The present system and device for grilling foods 10 also provides alternate modular raised-rail grate panels 12' with integrated, stylized branding irons 38, as seen in FIG. 6, such that utilization of such grate panel 12' enables creation of a stylized grill mark or brand on a cooked food. The branding irons 38 are preferably integrally formed coincident with raised rails 22 of grate panels 12' in order that heat may be transferred directly thereto according to thermal transfer via raised rails 22 and from heat reflection from inter-rail surfaces 24. Welding may also be utilized for attachment of branding iron 38 to grate panel 12'. Branding iron 38 may be configured as a licensed mark, such as collegiate logos, or any other desirable image, wherein the image may be effectively seared, or branded, onto foods, whether grilling outdoors or indoors. Additionally, as noted hereinabove, in an alternate embodiment, branding iron 38 may be removably securable to grate panel 12 and/or 12' via attachment means 39, wherein any suitable attachment means 39 may be utilized, such as, for exemplary purposes, a spring clip, threaded engagement, friction fit, or the like.

Figure 7:
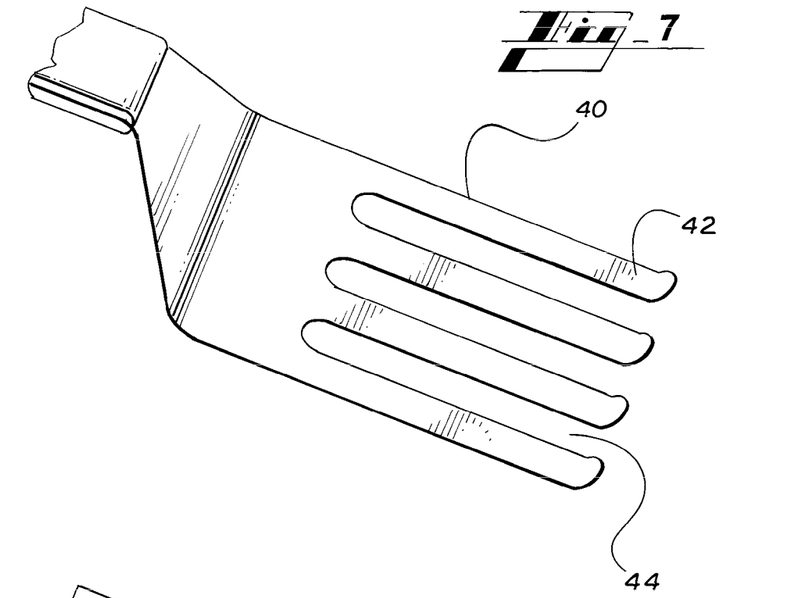
FIG. 7 is a partial, overhead view of an accessory spatula of the present invention.

Lastly, in order to facilitate non-destructive food-handling coincident with the use of system and device for grilling food 10, multi-fingered spatula 40 is preferably provided, depicted in FIG. 7. Multi-fingered spatula 40 is configured with fingers 42 and spaces 44 therebetween, wherein the width of spaces 44 is dimensioned to facilitate passage about raised rails 22, with extension of fingers 42 down toward inter-rail surfaces 34 of grate panel 12. Such configuration allows for lifting of food, for scooping of vegetables, bacon, or the like.

Figure 8:
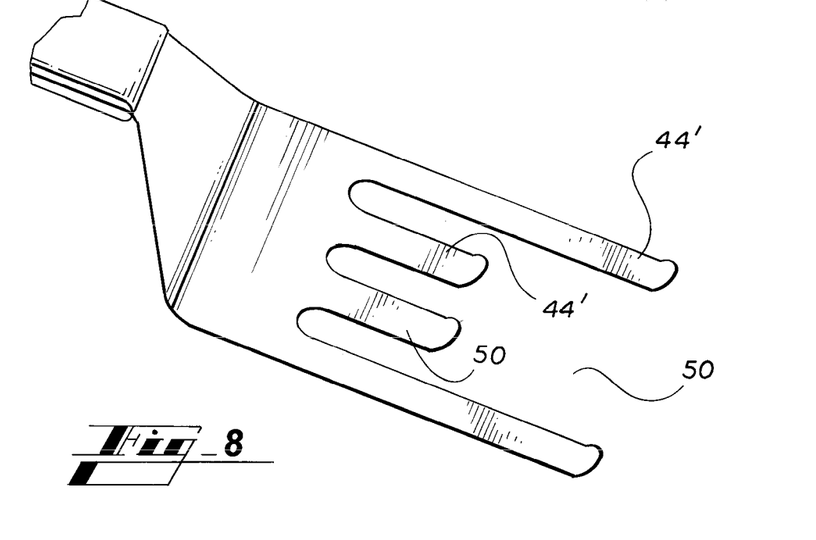
FIG. 8 is a perspective view of an accessory spatula of the present invention, showing an alternate finger configuration for utilization with a branding iron grate.

In an alternate embodiment, multi-fingered spatula 40' may be further adapted for specialized use with branding iron grate panel 12', wherein inner fingers 50 have a shorter length than remaining fingers 42 in order to facilitate lifting access between raised rails 22 on either side of branding iron 38, as seen in FIG. 8.

In the preferred use for oven grilling, system and device for grilling foods 10 is placed in an oven with food grilled atop raised rails 22 with grate panels 12 seated in mate pan 14. Alternately, or outdoor grilling, grate panels 12 are placed directly on a grill surface, again with food grilled atop raised rails 22.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

I claim:

1. A modular grilling system, comprising:
    a plurality of grate panels, each said grate panel of said plurality of grate panels further comprising a plurality of raised rails extending upwardly from a solid, flat base, said base having a rectangular-shaped perimeter and said base having a plurality of vents defined therethrough, wherein a first edge of said rectangular-shaped perimeter is adapted with a first interlockable structure, wherein a second edge of said rectangular-shaped is opposingly positioned relative to said first edge, wherein said second edge is adapted with a second interlockable structure, and wherein said first edge and said second edge are adapted to interlock together, wherein each said raised rail further comprises a flat surface extending along an elongate surface thereof,
    wherein each said grate panel is coated with an abrasion-resistant, high temperature, easy-to-clean, non-stick coating, and wherein said coating is able to withstand continuous heat at 600° F.; and
    a basin, said basin complementarily-shaped to contain and support said plurality of grate panels within a retentive peripheral edge of said basin, and said basin having a plurality of aperture-free sidewalls;
    wherein said basin further comprises a central cavity defining a depth, a supportive peripheral ledge extending about a margin of said basin and surrounding said central cavity, and the retentive peripheral edge extending about the peripheral ledge, wherein said plurality of grate panels is supported by said peripheral ledge and remains spaced above said central cavity at a distance substantially equal to said depth;
    wherein said plurality of grate panels directly engage an entire surface area of said peripheral ledge and extend to said retentive peripheral edge;
    wherein said peripheral edge has a plurality of linear sides configured to form a generally rectangular shape;
    wherein said first and second interlockable structures are linear and registered parallel to at least two of said linear sides of said peripheral edge;
    wherein said base of each of said grate panels is registered parallel to said peripheral ledge of said basin;
    wherein said first and second interlockable structures extends along a major longitudinal length of said at least two linear sides of said peripheral edge.

2. The system of claim 1, wherein said basin is coated with an abrasion-resistant, high-temperature, easy-to-clean, non-stick coating.

3. The system of claim 1, further comprising a branding iron.

4. The system of claim 3, wherein said branding iron is adapted for removable installation on at least one said grate panel.

5. The system of claim 1, further comprising a raised-rail adaptive cooking tool with a plurality of generally flat fingers, each said finger having a width enabling non-contact movement of each said finger between two adjacent of said plurality of raised rails.

6. The system of claim 1, wherein said coating is REALEASE porcelain enamel hybrid coating.

7. The system of claim 1, wherein said coating is an anodic coating.

8. The system of claim 3, wherein said branding iron is integrally formed coincident with said raised flat surface of at least one said grate panel.

9. The system of claim 3, wherein said branding iron defines a shape selected from the group consisting of a trademark or a collegiate logo.

10. The system of claim 4, wherein said removable installation of said branding iron is accomplished by a means selected from the group consisting of springed engagement, friction fit, or threaded engagement.

11. The system of claim 5, wherein said plurality of fingers further comprises a plurality of outer fingers having a first length and a plurality of inner fingers defined between said outer fingers, said plurality of inner fingers having a second length, wherein said second length of said plurality of inner fingers is shorter than said first length of said plurality of outer fingers.

* * * * *